United States Patent
Morino et al.

[11] Patent Number: 5,507,871
[45] Date of Patent: Apr. 16, 1996

[54] CENTRIFUGALLY TUMBLING TYPE GRANULATING-COATING APPARATUS

[75] Inventors: Jiro Morino; Nagayoshi Myo; Kaoru Kurita; Isaku Shichijo, all of Tokyo, Japan

[73] Assignee: Freund Industrial Co., Ltd., Tokyo, Japan

[21] Appl. No.: 201,553

[22] Filed: Feb. 24, 1994

[30] Foreign Application Priority Data

Mar. 10, 1993 [JP] Japan .................................. 5-048831

[51] Int. Cl.⁶ ................................................. B05C 11/00
[52] U.S. Cl. .............................. 118/680; 118/52; 118/712
[58] Field of Search .................................. 118/680, 694, 118/712, 52, 303, 416

[56] References Cited

U.S. PATENT DOCUMENTS

| | | | |
|---|---|---|---|
| 3,961,600 | 6/1976 | Homer et al. ............................ | 118/694 |
| 4,895,733 | 1/1990 | Imanidis et al. ....................... | 118/303 |
| 5,015,393 | 5/1991 | Russell et al. ......................... | 118/603 |
| 5,116,321 | 5/1992 | Gelain .................................... | 118/694 |
| 5,132,142 | 7/1992 | Jones et al. ............................ | 118/303 |
| 5,352,297 | 10/1994 | Peters et al. ........................... | 118/303 |

Primary Examiner—Timothy M. McMahon
Assistant Examiner—Robert Carpenter
Attorney, Agent, or Firm—Kane, Dalsimer, Sullivan, Kurucz, Levy, Eisele and Richard

[57] ABSTRACT

An apparatus for granulation and coating, wherein a rotary disk 2 provided at a bottom portion of a granulating vessel 1 is rotated for particles to centrifugally tumble on the rotary disk 2, while a powder material and a binder liquid are supplied into the granulating vessel 1. A position of a surface of a particle layer M in the granulating vessel 1 is detected by a sensor 18, to automatically adjust a position of a binder liquid supply port of a spray nozzle 13 in accordance with the detection signal informing of a change in the surface of the particle layer M.

9 Claims, 1 Drawing Sheet

CENTRIFUGALLY TUMBLING TYPE GRANULATING-COATING APPARATUS

BACKGROUND OF THE INVENTION

1. Field of the Invention

This invention relates to a granulating technique, and more particularly to a method of and an apparatus for manufacturing spherical particles used for pharmaceuticals, foods and the like; a method of coating powder onto these spherical particles as nuclei; and granulated products obtained by these methods and the apparatus.

2. Related Art Statement

Among the methods of manufacturing spherical or nearly spherical particles and of further making a powder such as a pharmaceutical powder adhere onto the particles, i.e. effectuating a so-called "powder coating", there are (1) a method in which powder is charged into a granulating vessel provided with a plane or dish-shaped rotary disk at the bottom thereof and a binder is sprayed to make the powder itself coheres, or further the powder is sprinkled thereover, and (2) a method in which particles as nuclei are charged into a granulating vessel, powder and a binder liquid are supplied thereto to make the powder adhere onto the surface of the nuclei, thereby obtaining granules of a desired shape.

In either one of the above-described granulating methods, in order to make granulated products of spherical or nearly spherical shape, or to make a uniform and dense layer of powder coating, it is necessary that the layer of the particles tumble centrifugally on the rotary disk of the granulating apparatus, and, to this end, the whole of the particles should not be in a floating fluidized state. In other words, in the granulating process with the above-described purpose, there should be the layer of the particles supported on the rotary disk.

The binder liquid for granulating and coating and the powder to be added during the operation are supplied onto these particles supported on the rotary disk. The binder liquid is usually added by spraying through a nozzle. In this case, unless the space density of the sprayed droplets is proper, the particles are locally excessively wet and agglomerations are generated, or wetting is so insufficient that the particles and the powder can not firmly adhere to each other or the powder itself can not firmly cohere.

The space density of the sprayed droplets decreases with increase of a distance between the supply port (spray nozzle) and the surface of the particle layer, so that it is necessary to make the distance within a predetermined range.

If the above-described distance is too small, the surface of the particle layer make a spray air stream turbulent, whereby the space density of the droplets is not uniform, and particles are excessively wetted in parts and insufficiently wetted in other parts.

On the contrary, if the above-described distance is too large, then the velocity of the sprayed droplets falls before they reach the particle layer, and, therefore, the droplets escape from the system because of the drying or fluidizing air, the droplets adhere to the wall of the apparatus to cause troubles, and/or a solvent is evaporated from the droplets to produce minute particles of the binder material (dusting phenomenon). Thus, there is a suitable range for the above-described distance not only from the requirements of the product quality but also from the process or operational requirements.

Furthermore, as regards supplying the powder, if the supply port for the powder is too close to the surface of the particle layer, then the density of the powder becomes excessively high locally, so that the uniform products cannot be obtained or the powder is agglomerated. On the contrary, if the supply port is too far from the surface of the particle layer, then the powder may adhere to the wall of the apparatus or the powder escapes from the system because of the drying or fluidizing air stream. From these reasons, there is a suitable range for the distance between the powder supply port and the surface of the particle layer also.

Now, in the granulation with the above-described purpose, quantity of the content in the granulating vessel increases gradually owing to the addition of the powder and the binder liquid, and as a result, the surface of the particle layer rises gradually with the progress of the granulation. Accordingly, the distance between the surface of the particle layer and the powder supply port or the spray nozzle decreases with time, so that the distance cannot be held within the suitable range during the whole process of the granulating.

However, there has not heretofore been known this fact that the distance between the supply port for the binder liquid to be sprayed or between the powder supply port and the surface of the particle layer constitutes an important factor for the finished quality of the granulated products.

Those skilled in the granulation work have experimentally known that, when a position of a spray gun is changed during the operation, a satisfactory result can be obtained in the finishing quality, yield and the like. It, however, has not been recognized that the above-described problem constitutes a main cause of the occurrence of troubles in granulating and coating processes, the problem being left unclarified, and the present inventors have clarified it for the first time.

As the simplest method to solve the above-described problem, an operator monitor and adjust the position of these supply ports in such a manner that the distance between the surface of the particle layer and the binder liquid supply port, or further the distance between the surface of the particle layer and the powder supply port are held within a proper range or, if possible, to a constant value at all times. However, the method like this is extremely troublesome, requiring much labor, lacking accuracy and being undesirable from the view point of Good Manufacturing Practice (GMP).

SUMMARY OF THE INVENTION

Present inventors have detected the position of the surface of the particle layer by a sensor, and, in accordance with the result of the detection, adjusted the positions of the supply ports for binder and powder automatically to be within suitable ranges.

A granulating method according to the present invention is of the type (1) and the type (2) described in the first page and is defined as one wherein a rotary disk having an edge portion being concentric with a circle of a horizontal cross-section of a granulating vessel is provided at a bottom portion of the granulating vessel, the rotary disk is rotated while gas is delivered into the granulating vessel through a slit formed between an inner wall of the granulating vessel and the edge portion of the rotary disk, and powder and a binder liquid are supplied to perform granulation while particles as nuclei or intermediate products are centrifugally tumbled, characterized in that:

the position of the surface of the particle layer supported on the rotary disk is detected by a sensor and the position of a binder liquid supply port is automatically adjusted in accordance with a signal from the sensor.

The granulation apparatus according to the present invention is one comprising:

a granulating vessel being of a circular shape in a horizontal cross-section;

a rotary disk provide at a bottom portion of the granulating vessel and having an edge portion being concentric with the circle of the cross-section of the granulating vessel;

a powder supplying means for supplying a powder material into the granulating vessel;

a binder liquid supplying means for supplying a binder liquid into the granulating vessel;

a slit formed between an inner wall of the granulating vessel and the edge portion of the rotary disk;

a means for delivering gas into the granulating vessel through the slit; and a means for rotating the rotary disk; wherein the apparatus further comprises:

a sensor for detecting a position of a surface of a layer of particle as nuclei or intermediate products on the rotary disk; and a first position adjusting means for automatically adjusting a position of a binder liquid supply port of the binder liquid supplying means.

Further, the granulated products according to the present invention are obtained by the abovedescribed method of granulating and the apparatus therefor.

In the method of and the apparatus for granulation according to the present invention, the position of the surface of the particle layer on the rotary disk in the granulating vessel is detected by the sensor and the positions of the binder liquid supply port and/or the powder supply port are automatically adjusted in accordance with the detection, so that the positions of the binder liquid supply port and the powder supply port can be held in the most suitable distance to the surface of the particle layer at all times, thereby enabling to effectuate stable and satisfactory granulating and coating operation at all times regardless of the level of the particle layer.

DETAILED DESCRIPTION OF THE EMBODIMENT

Figure 1:
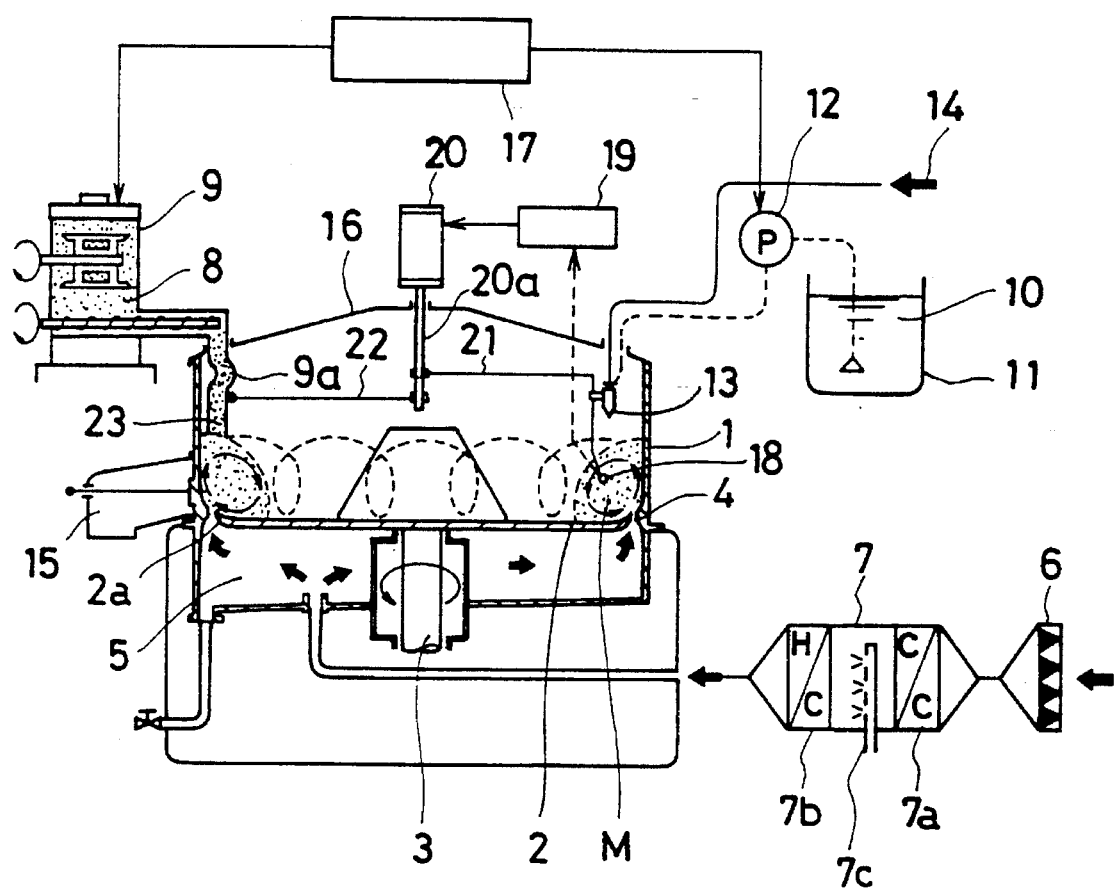
FIG. 1 is a sectional view showing one embodiment of the granulation apparatus used for carrying out the granulation method according to the present invention.

Referring to the drawing, a granulation apparatus in this embodiment has a construction of a so-called centrifugally tumbling type granulating-coating apparatus.

In this granulation apparatus, a granulating vessel 1 has a cylindrical construction being circular in the horizontal cross-section.

A generally planar rotary disk 2 is horizontally provided in a bottom portion of this granulating vessel 1, and rotatable about a rotary shaft 3. An edge portion 2a of the rotary disk 2 is slightly raised and concentric with the circle of the granulating vessel 1 in the horizontal cross-section, and an annular slit 4 is formed between the edge portion 2a of the rotary disk 2 and an inner wall of the granulating vessel 1.

An air chamber 5 is formed below the rotary disk 2, air is supplied from a blower, not shown, to the air chamber 5 through a prefilter 6 and an air conditioner 7 and the air is, then, delivered into the granulating vessel 1 as slit air through the slit 4. The air conditioner 7 includes a cooler 7a, a heater 7b provided with a temperature controller, and a humidifier 7c.

In order to supply a powder 8 for granulation into the granulating vessel 1, a screw feeder type powder supply device 9 is provided, for example.

Furthermore, in order to supply a binder liquid 10 for granulation into the granulating vessel 1, a spray nozzle 13 is provided in the granulating vessel 1. The spray nozzle 13 is communicated with a tank 11 for the binder liquid 10 through a precision pump 12 which can pump the liquid at constant rate. The binder liquid 10 from the tank 11 is blown out through the spray nozzle 13 together with high pressure air 14 supplied to the spray nozzle 13.

A product discharging device 15 for taking out the granulated products Is provided in the vicinity of the bottom portion of the granulating vessel 1, while a cover 16 is provided at the top of the granulating vessel 1.

Further, in this embodiment, a program controller 17 Is provided for program-controlling the powder supply device 9 and the binder liquid supply device such as the precision pump 12 so that the powder 8 and the binder liquid 10 are supplied in such a manner that a liquid/solid ratio on the surfaces of the particles as nuclei has a value satisfying a given program, the liquid/solid ratio being obtained by calculation considering moistures supplied into and escaped from the granulating vessel 1 by the air delivered into and discharged from the granulating vessel 1 respectively.

Furthermore, In this embodiment, to detect a surface of a particle layer M in the granulating vessel 1, a sensor 18 is provided. This sensor 18 detects a change in the position of the surface of the particle layer M. In accordance with the detection, the position of the binder liquid supply port of the spray nozzle 13 and the position of a powder supply port 23 of the powder supply device 9 are automatically adjusted.

To this end, the sensor 18 is connected to a controller 19 and the controller 19 operationally controls an actuator 20. The actuator 20 is constituted by an air cylinder, a hydraulic cylinder or a motor, for example, and is mechanically rigidly connected to the spray nozzle 13 through an arm 21, whereby, by automatically vertically moving the arm 21, the actuator 20 functions as a first position adjusting means for holding the position of the binder liquid supply port of the spray nozzle 13 at a predetermined distance, for example always constant distance, from the surface of the particle layer M.

Furthermore, in this embodiment, the actuator 20 is mechanically rigidly connected to a powder supply port 23 of the powder supply device 9 through the arm 22, and automatically controls the position of the powder supply port 23 in the vertical direction.

To this end, a powder supply outlet portion of the powder supply device 9 in this embodiment is formed to be a flexible portion 9a which is curved in an intermediate portion, and curved or extended to keep in pace with the vertical movement of the arm 22, so that the position of the powder supply port 23 can be variably controlled.

Operation of this embodiment will hereunder be described.

First in the granulating and coating operation, the particles as the nuclei are charged into the granulating vessel 1.

Then, the rotary shaft 3 is rotated by a driving source, not shown, to rotate the rotary disk 2, and, air is supplied into the granulating vessel 1 from the blower, not shown, through the prefilter 6, the air conditioner 7, the air chamber 5 and the slit 4, while the powder 8 is supplied from the powder supply device 9 and the binder liquid 10 is supplied from the tank 11 through the spray nozzle 13, into the granulating vessel 1.

With these operations, the particles are centrifugally tumbled on the rotary disk, and the granulating and coating are performed with the powder 8 and the binder liquid 10.

During this process, in this embodiment, the powder supply device 9 and the binder liquid supply device such as the precision pump 12 are controlled by the program controller 17 to supply the powder 8 and the binder liquid 10 in such a manner that the liquid/solid ratio on the surfaces of the particles as the nuclei has a value satisfying the given program, the liquid/solid ratio being obtained by calculation considering the moistures supplied into and escaping from the granulating vessel 1 by the air delivered into and discharge from the vessel 1 respectively. With this arrangement, in the granulation apparatus in this embodiment, the satisfactory granulated products having a uniform particle diameter can be produced at the best liquid/solid ratio.

Furthermore, in this embodiment, the sensor 18 for detecting the position of the surface of the particle layer M on the rotary disk 2, detects the rise of the position of the surface of the particle layer M because the quantity of the particle layer increases as the powder material is supplied from the powder supply device 9 and the binder liquid 10 is supplied from the spray nozzle 13 as the granulating and coating process proceeds.

A detection signal from the sensor 18 is delivered to the controller 19, and, then, the controller 19 operates the actuator 20. By this, if the actuator 20 is a cylinder for example, a piston rod 20a thereof is retracted, i.e., raised.

As a result, the spray nozzle 13 rigidly connected to the piston rod 20a through an arm 21 is raised along with the piston rod 20a. The rising distance and speed are made to coincide with the rising distance and speed of the position of the surface of the particle layer M, which are detected by the sensor 18.

Accordingly, the distance between the binder liquid supply port of the spray nozzle 13 and the surface of the particle layer M is always held substantially constant, and the binder liquid 10 sprayed from the binder liquid supply port of the spray nozzle 13 reaches the surface of the particle layer M in substantially constant conditions, thereby uniform granulating and coating are stably realized at all times.

Furthermore, in this embodiment, the piston rod 20a of the actuator 20 is rigidly connected to the powder supply port 23 of the powder supply device 9 through the arm 22, so that the flexible portion 9a is flexed as the piston rod 20a rises and the powder supply port 23 is also raised at the same rising distance and speed as the piston rod 20a and the spray nozzle 13.

Accordingly, the powder is supplied from the powder supply port 23 to the particle layer M in substantially constant positional conditions with respect to the particle layer M.

As a result, the conditions of supplying the powder from the powder supply port 23 are substantially constant, and it becomes possible to perform uniform granulating and coating. Further, as described above, the binder liquid supply port of the spray nozzle 13 and the powder supply port 23 are raised synchronously by the same distance, whereby the conditions of supplying both the binder liquid and the powder to the particle layer M are substantially constant, so that the satisfactory spherical particles having a uniform particle diameter can be obtained at all times and the desirable granulating and coating can be performed reliably.

EXAMPLE 1

As nuclei, 20 kg of granulated sugar having a mean particle diameter 270 μm were charged into a centrifugally tumbling type coating apparatus (trade name CF-1300 manufactured by Freund Industrial Co., Ltd.), to which a sensor 18, an actuator 20, arms 21, 22, and a program controller 17 were provided as shown in FIG. 1, the arms 21, 22 connecting a spray nozzle 13 and a powder supply port 23 respectively to a piston rod 20a of the actuator 20. While a rotary disk was rotated at 80 rpm, air was delivered through the slit formed between the inner wall of the apparatus and the edge portion of the rotary disk, powder sugar was delivered through the powder supply device, and sugar syrup of 50% by weight was sprayed from the spray nozzle.

In this case, as for the air delivered into the granulating vessel, the air from the blower was dehumidified through the cooler, and subsequently, adjusted to the temperature of 29±1° C. and the moisture of 37.5±0.5%. An air supply rate was increased from the initial 3.5 m$^3$/min gradually to the final 4.5 m$^3$/min.

A supply rate of the syrup was increased from the initial 150 ml/min gradually to the final 300 ml/min. The powder sugar was supplied by a rate calculated by a program which takes into consideration the moistures brought in and taken away by the air delivered into and discharged from the granulating vessel respectively to keep the liquid/solid ratio constantly at 0.20, and, totally, 118 kg of the powder sugar was supplied in 80 minutes.

In this Example, as the sensor a vibration sensor was used, and when the vibration output exceeded a predetermined value due to the contact with the particle layer, the program was set to raise the sensor, the spray nozzle and the powder supply port by 2 cm. The distance between the surface of the particle layer and the spray nozzle was adapted to be 10 cm, and, in accordance with the above-described setting conditions, the sensor was caused to operate by the vibration output produced when the sensor sank into the particle layer by about 2 cm. Furthermore, the powder supply port was adapted to contact the substantially surface of the particle layer.

By this method, the satisfactory spherical particles having a particle diameter from 500 to 710 μm were obtained at a yield of 92.2%.

EXAMPLE 2

The same operations as Example 1 were made except that the powder supply port was set 20 cm upward of the surface of the particle layer at the time of the charge.

In this Example 2, the satisfactory spherical particles having the particle diameter from 500 to 710 μm were obtained at a yield of 89.3%.

COMPARATIVE EXAMPLE 1

The operations were made under the same conditions as in Example 2 except that no vibration sensor was used, the distance between the spray nozzle and the surface of the particle layer at the time of the charge was set at 25 cm, and the spray nozzle was fixed at that position.

In this case, many agglomerations were formed in the particle layer and the particles having the particle diameter from 500 to 710 μm were obtained at a yield of 65.5%.

EXAMPLE 3

As the sensor, a strain sensor was used and the same operations were made as in the Example 1 except that, when strain exceeded a predetermined value for more than 30 seconds in a time period of one minute, the sensor, the spray nozzle and the powder supply port were set to be raised by 3 cm.

The particles obtained in this Example 3 were spherical ones having the uniform particle diameter and the yield was 91.9%.

EXAMPLE 4

The same operations were made as in Example 3 except that the distance from the surface of the particle layer was so set and adjusted that strain of the strain sensor is constant.

The particles obtained in this Example 4 were also the spherical ones having the uniform particle diameter and the yield was 92.4%.

Hereinabove, detailed description has been given of the invention made by the present inventors with reference to the embodiment and the examples, however, the present invention should not be limited to the above embodiment and examples, and it is needless to say that various modifications can be made within a scope of the invention.

For example, as a method of automatically adjusting the positions of the binder liquid supply port and the powder supply port, it is optional to select a method wherein the lower limit value of the distance from the surface of the particle layer is set within a suitable range and, when the distance becomes smaller than this lower limit, the supply ports are lifted to a certain distance separately determined; a method of adjusting the position of the supply ports so as to keep a predetermined distance at all times; or any other method. Furthermore, the operations may be made based on the instantaneous position of the surface of the particle layer or on an average value during a predetermined time period.

Further, as a sensor, it is optional to use an optical sensor, an electrical sensor, a sensor using an ultrasonic wave or the like, or a mechanical sensor. Favorable ones are those based on a mechanical principle relating to their contact with the particle layer such as one detecting vibrations, deformation, stress or the like of the sensor.

As a granulation apparatus, one having a generally planar rotary disk with a slightly raised edge portion was shown in FIG. 1 as an embodiment. However, a rotary disk may be of a dish shape or a flat-bottomed bowl shape having an edge portion being raised much higher.

The following is brief description of the effects obtained by the typical inventions out of ones disclosed in the present application.

(1) The position of the surface of the particle layer is detected to automatically adjust the position of the binder liquid supply port, whereby the conditions of supplying the binder liquid to the particle layer are substantially constant at all times, so that granulating and coating operations are stably effectuated at all times, and it is possible to obtain granular products having a satisfactory spherical shape and a uniform particle diameter.

(2) The position of the surface of the particle layer is detected to automatically adjust the position of the powder supply port to the particle layer, whereby the conditions of supplying the powder are substantially constant at all times, and it is possible to obtain granular products having a satisfactory spherical shape and a uniform particle diameter.

(3) When the positions of both supply ports for the binder liquid and for the powder to the particle layer are automatically adjusted as described in the above items (1) and (2), both conditions of supplying the binder liquid and of supplying the powder can be made substantially constant at all times, so that, as the combined effects thereof, granular products having a satisfactory spherical shape and a uniform particle diameter can be obtained.

What is claimed is:

1. A granulation apparatus, comprising:
   a granulating vessel being of a circular shape in a horizontal cross-section;
   a rotary disk provided at a bottom portion of the granulating vessel and having an edge portion being concentric with a circle of the horizontal cross-section of the granulating vessel, said edge portion of the rotary disk spaced from an inner wall of the granulating vessel so as to form a peripheral slit;
   a powder supplying means for supplying a powder material into the granulating vessel;
   a binder liquid supplying means for supplying a binder liquid into the granulating vessel;
   a means for delivering gas into the granulating vessel through the slit;
   a means for rotating the rotary disk;
   a sensor for detecting a position of a surface of a particle layer supported on the rotary disk; and
   a first position adjusting means for automatically adjusting a position of a binder liquid supply port of the binder liquid supplying means in accordance with a signal from the sensor.

2. A granulation apparatus as set forth in claim 1, wherein said apparatus further comprises a second position adjusting means for automatically adjusting the position of a powder supply port of said powder supplying means in accordance with the signal from said sensor.

3. A granulation apparatus as set forth in claim 2, wherein said first position adjusting means and said second position adjusting means comprise a single actuator operationally controlled by a controller receiving the signal from said sensor, for synchronously operating both the first and second position adjusting means.

4. A granulation apparatus as set forth in claim 2, wherein said second position adjusting means automatically changes the position of said powder supply port to keep the distance between said powder supply port and the surface of a particle layer substantially constant.

5. A granulation apparatus as set forth in claim 1, wherein said sensor functions based on a mechanical principle.

6. A granulation apparatus as set forth in claim 5, wherein said sensor is a vibration sensor for measuring the vibration generated by the contact with the particle layer.

7. A granulation apparatus as set forth in claim 5, wherein said sensor is a strain sensor for measuring the deformation generated by the contact with the particle layer.

8. A granulation apparatus as set forth in claim 5, wherein said sensor is a stress sensor for measuring the stress generated by the contact with the particle layer.

9. A granulation apparatus as set forth in claim 1, wherein said first position adjusting means automatically changes the position of said binder liquid supply port to keep the distance between said binder liquid supply port and the surface of a particle layer substantially constant.

\* \* \* \* \*